Figure 1:
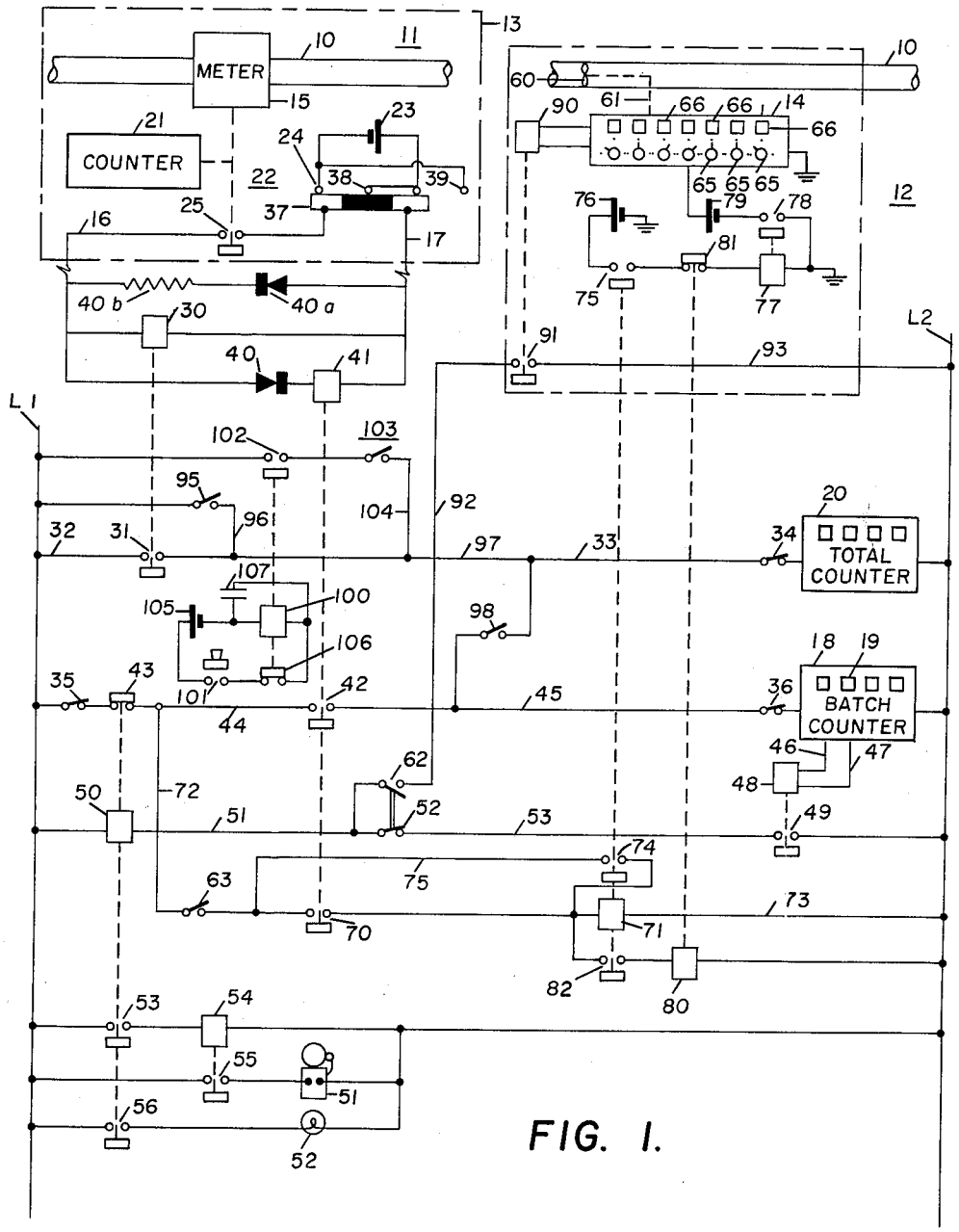

ROGER G. SMITH
INVENTOR.

United States Patent Office

3,138,013
Patented June 23, 1964

3,138,013
SYSTEM FOR CALIBRATING PIPE LINE
FLOW METERS
Roger G. Smith, Irving, Tex., assignor to Socony Mobil
Oil Company, Inc., a corporation of New York
Filed Nov. 30, 1961, Ser. No. 156,102
3 Claims. (Cl. 73—3)

This invention relates to the calibration of flow meters and more particularly to a system for calibrating a flow meter located at one pumping station in the pipe line with a master flow meter remotely located therefrom at another pipe line station.

In the operation of pipe lines it is the practice to transmit under pressure successive batches of different hydrocarbon liquids. These batches of product traveling along the pipe line in series are controlled with respect to their destination by switch valves in the pipe line operated in response to the detection or determination of the interface between adjacent batches. The manner of detecting the interface at a given pumping station or switching station takes on many forms. For example, there may be employed radioactive tracers at the interface inserted at the point of origin of the product into the pipe line. Density meters have also been employed. Another common arrangement for detecting the arrival of an interface includes the use of meters capable of measuring the quantity of liquid flowing past a given point in the pipe line in terms of barrels. Knowing the length of the pipe line between two stations and the internal dimensions thereof, it is possible to determine when any given interface will arrive at a given station; and by employing a suitable flow meter, it is possible also to determine when a particular batch has moved past the station.

In employing the batch measuring process, it is imperative that the meters employed accurately measure the quantity of product flowing past the measuring point. To this end, it is important that the meters be calibrated accurately for this measuring purpose. Accordingly, it is an object of the present invention to provide a system for calibrating meters remotely located one from the other along a common flow line.

To carry out this object, there is provided in accordance with the present invention an arrangement for comparing, for proving, or for calibration purposes the output of a first flow meter with the output of a second flow meter wherein both flow meters are responsive to a common flow of liquid between the locations of the meters. The arrangement includes a means responsive to an impulse from the first meter indicative of the passage of one measured unit of fluid through the first meter to apply a start impulse to the second meter. Means is provided for registering the output of the first meter. The second meter is limited to the number of fluid units to be measured. A means responds to the attainment by the second meter of the preset number of fluid units to interrupt the registering means for comparison of the amount registered with the preset number of fluid units.

In a preferred arrangement of the present invention the means for applying a start impulse comprises a polarity-sensitive circuit including a relay for closing an energizing circuit for the second flow meter.

Since the arrangement contemplates the calibration of remotely located meters, the information from the master meter will be applied over a communication channel to the vicinity of the second meter which is to be calibrated. In the event of a breakdown in the communication channel, such as, for example, an interrupted circuit in a telephone line, there is provided in accordance with the present invention a means in circuit with the first registering means for bringing the amount registered in the vicinity of the second meter into coincidence with the amount registered by a registering means or counter located near the first or master meter.

For a better understanding of the present invention and for further objects and attendant advantages thereof, reference may be had to the following detailed description taken in conjunction with the accompanying drawing wherein:

FIG. 1 illustrates schematically a system embodying the present invention.

Referring now to FIG. 1, there is shown a pipe line 10 which extends between two pipe line stations 11 and 12. The pipe line 10 has been broken to indicate considerable distance between the stations 11 and 12, although it will be understood that the invention is equally applicable to stations physically located close to one another. The first station 11 includes the apparatus enclosed within box 13, and the second station 12 includes the equipment and circuitry shown in the remainder of the drawing. The system of the present invention provides a means for proving a meter 14 located at the remote station 12 with a master meter 15 located at the station 11 which may be the source of the liquid flowing in the pipe line 10. Such a source could, of course, take the form of a refinery or a central storage facility.

The meter 15 is arranged to produce impulses which are calibrated to represent the number of barrels of product flowing in the pipe line 10. This information is transmitted over a communication channel here represented by a telephone line comprised of conductors 16 and 17 which extend between the stations 11 and 12. These impulses representative of the number of barrels of product appear at the face of a batch counter 18 and may be registered digitally by a suitable indicator 19 associated with the counter. The flow meter 14, sensitive to flow of product through the pipe line at the station 12, is provided with means whereby the meter may have preset into it a predetermined number of barrels. Upon attainment of that predetermined number of barrels flowing through the pipe line at station 12, the meter 14 will generate a signal which is effective to de-energize the registering device or batch counter 18. The registration at the face of the batch counter 18 may now be compared with the predetermined or fixed number of barrels preset into the meter 14. From this comparison may be determined a meter factor which is employed automatically to correct any readings appearing at the meter 14 whenever a product of like character is again being transmitted over the pipe line 10.

In addition to the batch counter 18, there may also be provided at the station 12 a total counter 20 which repeats the output of a counter 21 located at station 11. The output of counter 20 is a figure representing the total barrels of product being pumped from station 11 and measured by the flow meter 15.

The registration on the total counter 20 at station 12 is carried out in the following manner. The station 11 includes a pulse generator 22 comprising a source represented by a battery 23 connected by way of a switch 24 and relay contacts 25 to the transmission lines 16–17. The relay contacts 25 are closed each time the flow measuring meter 15 detects one barrel of product. Upon closure of the circuit, a pulse of either negative or positive polarity, depending upon the position of switch 24, is applied to the lines 16 and 17 for transmission to the station 12. Relay 30, connected across lines 16 and 17, responds both to negative and to positive pulses to close its contacts 31 to apply a signal pulse to the counter 20 from a suitable source of power represented by power lines L1, L2. The signal pulse is applied by way of a circuit that may be traced from power line L1, thence by way of conductor 32, relay contacts 31, conductor 33, closed switch 34, the counter 20, and the other power line L2. In this manner, the total counter 20 is useful in maintaining a record of the total product flowing from the source as represented by station 11.

Whenever it is desired to take such steps as are required in operating on batch shipments, it will be known from prior information regarding the length of the pipe line and its diameter the number of barrels that must be pumped from the source station 11 before the interface between adjacent batches arrives at the station 12. Accordingly, the batch counter 18 may have preset into it the number of barrels of product required in the pipe line for the batch to reach the station 12. Switches 35 and 36 are initially closed at station 12, and at station 11 the commutator 37 of sliding switch 24 is moved to engage contacts 38 and 39 so as to reverse the polarity of the pulses applied to the network including the relay 30 at station 12. With the source 23 connected as described, the polarity of pulses will now be of such nature so as to cause current to flow, each time a pulse is generated as by closure of relay contacts 25, through rectifier 40 and relay 41. At the same time, the relay 30 will also be activated. It will be remembered that this relay is responsive to pulses of both positive and negative polarity. Serially connected rectifier 40a and resistor 40b provide circuit balance with the value of resistor 40b selected to approximately equal the resistance of the operating coil of relay 41.

With the energization of relay 41, its contacts 42 are closed to complete a circuit applying power to the batch counter 18. This circuit may be traced from power line L1, thence by way of closed switch 35, closed relay contacts 43, conductor 44, closed relay contacts 42, conductor 45, closed switch 36, the counter 18, and the other power line L2.

When the predetermined number of barrels has been counted by the meter 15 and registered on the batch counter 18, the counter 18 automatically will generate a signal indicating end of count and apply this signal by way of conductors 46 and 47 to energize relay 48.

The energization of relay 48 will perform two functions. It will cause an alarm or an enunciator circuit to be energized and also immediately disconnect the batch counter 18 so as to render it nonresponsive to further pulses. The disconnect and alarm functions are provided in the following manner. Upon energization of relay 48, its contacts 49 will close to complete a circuit to energize relay 50. This circuit may be traced from power line L1, thence by way of relay coil 50, conductor 51, closed switch 52, conductor 53, relay contacts 49, and line L2. The energization of relay 50 immediately opens its contacts 43 which interrupts the power circuit for the batch counter 18. At the same time, contacts also associated with the relay 50 are closed to energize the alarm bell 51 and to illuminate the alarm light 52. The bell is energized by closure of relay contacts 53 which immediately apply power to a control relay 54 which in turn picks up or otherwise closes its contacts 55 to connect the alarm bell 51 across the power lines L1 and L2. The closure of relay contacts 56 as controlled by relay 50 closes the circuit to place the alarm light 52 across the power lines L1 and L2.

Upon the ringing of the bell, the operator at station 12 knows that the interface has arrived at the station; and he may take such steps as may be required, such as, for example, switching of the pipe line product for storage at station 12 or to otherwise control the shipment of the product following the arrival of the interface at the station 12.

The meter 14 at station 12 may now be employed to further control the shipment of product along the pipe line. This meter 14 measures the product which flows in the common flow line between the stations 11 and 12; and upon arrival of the interface at station 12, the output of meter 14 may now be employed to register the number of barrels flowing through station 12. The meter 14, preferably as illustrated, is of the turbine meter type comprising a turbine or fan blade 60 disposed in the path of the liquid flowing in the pipe line 10. The flow of liquid causes the turbine to rotate. As well known in the art of turbine meters, the rotation of the turbine 60 may be employed to interrupt a magnetic field and give rise to the production of pulses which are counted by a suitable counting device. On the other hand, the impeller may, as illustrated, be mechanically coupled by way of shaft 61 to drive a generator of impulses, which impulses are representative of the quantity of fluid flowing through the pipe line. In order that the information be useful, the impulses are converted in a manner well known in the art to information representative of barrels or other suitable units of liquid flow in the pipe line 10. However, inasmuch as the rotation of the impeller 60 is a function of the viscosity of the liquid flowing in the pipe line, the conversion factor must be changed each time there is a change in product flowing in the pipe line. At one station employing the present invention, this is done for five different products. Accordingly, the meter 14 must periodically be proved or calibrated with a master meter such, for example, as the meter 15 which may be of the positive displacement type. This is done for each type of liquid that is to be transmitted along the pipe line.

In accordance with the present invention, the meter 14 may readily be proved or otherwise calibrated with the meter 15 in the following manner. Assuming that a batch has arrived at station 12 and its arrival announced by batch counter 18 in the manner above described, batch counter 18 will be returned to zero. Switch 52 is now opened and switch 62 is closed to transfer control of the relay 50 from the batch counter 18 to the turbine meter counter 14. Now with a product of known quality and viscosity flowing through the pipe line 10, the switch 63 will be closed. The meter 14 has previously been preset with a given number of units of liquid to be employed for calibration purposes. This information may be fed into the meter 14 by manipulation of the dials 65 with the preset figure being viewed by the indicator windows 66.

With the system prepared in the manner above described, the turbine meter 14 will begin counting the product flowing in pipe line 10 with the production of the very next impulse at station 11 as by closure of the relay control switch 25; and counter 18 will begin repeating the counts registered by counter 21 at station 11. The pulse flowing through rectifier 40 energizes relay 41 to close, in addition to relay contact 42 for application of a pulse to batch counter 18 in the manner above described, a second relay contact 70 which is effective to energize a start relay 71. The energization circuit for the start relay 71 may be traced from power line L1 by way of closed switch 35, closed relay contacts 43, conductor 72, closed switch contact 63, closed relay contacts 70, the operating coil of the relay 71, and the conductor 73 to the other power line L2. The relay 71 is held in an energized condition by way of a holding circuit including relay contacts 74 and conductor 75 which bypass the relay control contacts 70 to maintain the relay 71 energized independent of the closure of contacts 70. The energization of relay 71 closes contacts 75 for applying from the battery 76 energizing current to the control winding of relay 77. Relay 77 now operates to close its contacts 78 to apply a start impulse to the meter 14 from a suitable source of power as represented by battery 79.

Since the particular fluid flow meter employed is sensitive to further start impulses, there is provided a means for interrupting the energizing circuit for relay 77 and to maintain it de-energized throughout the calibration period. The de-energizing circuit comprises a relay 80 which is of the time-delay type, that is, its operation is delayed a fixed period after application of power thereto to open contacts 81 in the energizing circuit of the relay 77 and thus to open the start circuit including battery 79 for the turbine meter. The relay 80 includes an operating coil connected in an energizing circuit that is closed by the operation of relay 71 in the manner previously described to close contacts 82.

At the end of the predetermined period of testing, that is, when the turbine meter 14 has accumulated a number of counts representative of the predetermined number of barrels to be used for calibration purposes, the turbine meter 14 generates a control pulse which is effective to de-energize the batch counter 18 so that a comparison may now be made as between the output registered by indicator 19 of the counter 18 with the predetermined number of barrels previously set into the turbine meter 14. The circuit for carrying out the de-energization of the batch counter 18 includes a relay 90 connected to a pulse generator provided in the turbine meter 14 and effective to close its contacts 91 to apply power to relay 50. The energizing circuit for the relay 50 may be traced from power line L1 by way of an operating coil of relay 50, conductor 51, closed switch 62, conductor 92, closed relay contacts 91, and conductor 93 to the other power line L2. The energization of the relay 50 performs two functions as earlier described, that is, the relay opens the energizing circuit for the batch counter 18 and renders it insensitive to further pulses otherwise produced by closure of relay contacts 42 in response to counting pulses from the control station 11. The relay further closes the alarm circuits comprising the audible alarm 51 and the visual alarm 52, indicating to an operator that the calibration or proving procedure has been completed.

It is conceivable that from time to time the communication channel between stations 11 and 12 may be disrupted by reason of a break in the line comprising the conductors 16 and 17. Should such a disruption occur during any of the above-described operations, whether they involve detecting the arrival of the interface at the station 12 or the calibration or proving of the meter 14, considerable time would be lost if the operation had to be started anew upon resumption of communications. Accordingly, there is provided a means whereby, in the event of a temporary disruption of communications, the amounts registered by the batch counter 18 or by the total counter 20, or both, may be rapidly brought into coincidence with the amount registered by counter 21 at station 11. Should the discrepancy in counts between the counters 18, 20, and 21 be few in number, there is provided a manual count make-up arrangement comprising switch 95 which manually may be pulsed open and closed to provide pulses for the total counter 20 and for the batch counter 18. The pulses would be applied from the power line L1 by way of the closed switch 95, conductor 96, conductor 97, conductor 33, closed switch 34, the total counter 20, and thence to the power line L2. Should it be desired at the same time to bring the batch counter into coincidence, then switch 98 may be closed to connect the batch counter 18 to the fixed contact of switch 95 by way of conductor 45, closed switch 98, and conductors 97 and 96. Alternatively, should it be desired only to bring the batch counter into coincidence with the counter 21, then switch 34 may be opened and switch 98 closed which effectively connects the batch counter to the switch 95 and disconnects the total counter 20 therefrom.

In the event that there is a large discrepancy in the number of pulses registered by the counters 18, 20, and 21, there is provided a pulse generator including relay 100 which automatically and at a rapid rate generates pulses upon closure of hand-operated switch 101 to apply make-up counting pulses to the batch counter 18 and/or to the total counter 20. The energization of relay 100 closes its contacts 102 to connect the total counter 20 across the power lines by way of a circuit that may be traced from the power line L1, closed relay contact 102, closed switch 103, conductor 104, conductor 97, conductor 33, closed switch 34, the total counter 20, and thence to the other power line L2. It will be remembered from the previous description that by selective closing and opening of the switches 34 and 98 either, or both, of the counters 18 and 20 may be connected for receipt of pulses being applied over conductor 97.

The pulse generator which includes the relay 100 is provided with a source of power represented by battery 105 which is connected across the operating coil of relay 100 by way of manually operated switch 101 and back contacts 106 of relay 100. The operating coil of relay 100 is shunted by a capacitor 107 which provides a time delay operation for the relay 100 and operates in the following manner. With the relay 100 de-energized the condenser 107 begins to charge and at a time predetermined by the time constants of the circuit including the operating coil of the relay 100 and the condenser 107, the relay 100 will energize and pick up its back contact 106 to interrupt the energizing circuit. However, condenser 107 now discharges through the operating coil and effectively holds the relay up in an energized state. When the condenser or capacitor 107 is sufficiently discharged, the relay coil drops out again closing the back contacts 106 to repeat the operation. In one embodiment of the invention, the capacitor had a value of approximately 3 microfarads and the time constant of operation was such that the on-off ratio of the relay was approximately 50 percent. The relay operated at approximately 12 pulses per second.

In the above-mentioned embodiment of the invention, which is now in use, the meter 14 is of the turbine type commercially available from the Potter Aeronautical Company and identified as their Model 526R21 AC–SP181.

The meter 15 employed at the central station 11 may be of the positive-displacement type including a pulse generator for operating the relay contacts 25 and is available from A. O. Smith Corporation, Model D50 P.D. Meter.

The counters 18, 20, and 21, respectively, may be of the following types: Durant Productimeter, Model 5–SP–1 MF Predetermined Electric; General Controls Model PIC 600 Electric Counter; and A. O. Smith Mechanically Driven No. 3341 Large Numeral Counter.

Now that the invention has been described, it will be understood that modifications will become apparent to those skilled in the art; and it is intended to cover all such modifications as fall within the scope of the appended claims.

What is claimed is:

1. An arrangement for calibrating flow meters comprising:

a first flow meter adapted to generate impulses in accordance with the number of units of fluid passing through said first flow meter and measured thereby, said first flow meter being located at a first position in a flow of fluid;

a second flow meter adaptable to determine the number of units of fluid passing through said second flow meter during a test period the duration of which is dependent upon such determination, said second flow meter being located at a second position in said flow of fluid;

adjustable means for presetting said second flow meter to generate a control pulse upon said second flow meter measuring a preset number of units of fluid passing therethrough, said control pulse defining one limit of said test period;

switching means connected to said first and second flow meters and adaptable to be responsive to an impulse generated by said first flow meter to activate said second flow meter, such impulse defining the other limit of said test period;

register means responsive to said switching means for recording impulses from said first flow meter during said test period; and means coupled between said second flow meter and said switching means and responsive to said control pulse to interrupt said register means.

2. Apparatus for calibrating a meter in a pipe line comprising:

a first flow meter located in a pipe line and adapted to generate impulses in accordance with the number of units of fluid passing therethrough;

a second flow meter located in said pipe line and adaptable to generate a control pulse upon measuring a predetermined number of units of fluid passing therethrough during a test period the duration of which is dependent upon such measurement;

switching means connected to said first and second flow meters and adapted to be responsive to an impulse generated by said first flow meter to activate said second flow meter, said impulse defining the start of said test period;

register means connected to said switching means for recording impulses from said first flow meter upon the activation of said second flow meter;

adjustable means for presetting said second flow meter to generate said control pulse, said control pulse defining the expiration of said test period; and relay means connected to said switching means and responsive to said control pulse to render said register means nonresponsive to impulses from said first flow meter for comparison of the amount registered during said test period by the register means with said predetermined number of fluid units.

3. An arrangement for comparing for calibration purposes the outputs of flow meters in a pipe line, comprising:

a first flow meter at one location in a pipe line, said first flow meter being adapted to generate impulses in accordance with the number of units of fluid passing therethrough;

a second flow meter at another location in said pipe line, said first and second flow meters being adapted to be responsive to the flow between the location of said meters of fluid of the same character during a test period the duration of which is dependent upon said second flow meter, said second flow meter being adaptable to generate a control pulse defining the expiration of said test period upon measuring any preset number of units of fluid passing therethrough;

a register means positioned at the location of said second flow meter and adapted to record impulses generated by said first flow meter during said test period; and switching means connected to said first flow meter, said second flow meter and said register means, said switching means including a switch arrangement for activating said second flow meter upon the generation by said first flow meter of an impulse defining the start of said test period, a conductive path from said first flow meter to said register means for recording impulses corresponding to the number of fluid units measured by said first flow meter during said test period, and a relay control connected to said second flow meter and responsive to the generation of said control pulse for interrupting said register means at the expiration of said test period.

References Cited in the file of this patent

UNITED STATES PATENTS

| | | |
|---|---|---|
| 2,772,561 | Plank et al. | Dec. 4, 1956 |
| 2,958,218 | Hill | Nov. 1, 1960 |
| 3,021,703 | Pfrehm | Feb. 20, 1962 |
| 3,028,744 | Bagwell | Apr. 10, 1962 |